United States Patent
Barchasz et al.

(10) Patent No.: US 8,900,484 B2
(45) Date of Patent: Dec. 2, 2014

(54) COMPOSITE SULPHUR/CARBON CONDUCTIVE MATERIAL, USE AS AN ELECTRODE AND METHOD FOR PRODUCING SUCH A MATERIAL

(75) Inventors: Celine Barchasz, Grenoble (FR); Yves-Gregoire Assouan, Toulouse (FR); Carole Bourbon, Saint-Michel de Saint-Geoirs (FR); Sébastien Patoux, Fontaine (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 344 days.

(21) Appl. No.: 13/386,285

(22) PCT Filed: Jul. 7, 2010

(86) PCT No.: PCT/FR2010/000500
§ 371 (c)(1),
(2), (4) Date: Jan. 20, 2012

(87) PCT Pub. No.: WO2011/010010
PCT Pub. Date: Jan. 27, 2011

(65) Prior Publication Data
US 2012/0119158 A1    May 17, 2012

(30) Foreign Application Priority Data
Jul. 20, 2009  (FR) ...................................... 09 03558

(51) Int. Cl.
*H01B 1/04*    (2006.01)
*H01B 1/24*    (2006.01)
(Continued)

(52) U.S. Cl.
CPC ......... *C01B 17/0248* (2013.01); *Y02T 10/7011* (2013.01); *C01P 2006/12* (2013.01);
(Continued)

(58) Field of Classification Search
CPC ...... H01B 1/24; H01M 4/362; H01M 4/5815; H01M 4/136; H01M 4/382; H01M 10/052; H01M 2004/021; C01B 17/0221
USPC ................... 252/502–509; 429/231.8, 231.9; 423/447.8
See application file for complete search history.

(56) References Cited

U.S. PATENT DOCUMENTS 4,127,634 A  11/1978  Joo
7,361,431 B2  4/2008  Kim et al.
(Continued)

FOREIGN PATENT DOCUMENTS

JP  A-2006-092883  4/2006

OTHER PUBLICATIONS

Kobayashi et al., "All solid-state battery with sulfur electrode and thio-lisicon electrolyte," *Journal of Power Sources*, vol. 182, pp. 621-625, 2008.

(Continued)

*Primary Examiner* — Mark Kopec
(74) *Attorney, Agent, or Firm* — Oliff PLC

(57) ABSTRACT

A method for producing a composite sulphur/carbon conductive material obtained solely from an initial sulphur and an initial carbon which includes the following successive steps between 50% and 90% by weight of initial sulphur and between 50% and 10% by weight of initial carbon having a specific surface smaller than or equal to 200 m²/g are placed in a reactor at atmospheric pressure, the sum of the proportions respectively of the initial sulphur and carbon attaining 100%, the reactor is hermetically sealed at atmospheric pressure, and the composite sulphur/carbon conductive material is formed, in powder form, by heat treatment by heating said reactor to a heating temperature comprised between 115° C. and 400° C., without external regulation of the pressure inside the reactor, and keeping said reactor at said heating temperature during a predetermined time.

9 Claims, 6 Drawing Sheets

(51) Int. Cl.

| | |
|---|---|
| *C01B 17/00* | (2006.01) |
| *H01M 4/1397* | (2010.01) |
| *H01M 4/58* | (2010.01) |
| *C01B 17/02* | (2006.01) |
| *H01M 4/136* | (2010.01) |
| *H01M 4/62* | (2006.01) |
| *H01M 10/052* | (2010.01) |

(52) U.S. Cl.
CPC ............. *H01M 4/1397* (2013.01); *H01M 4/58* (2013.01); *H01M 4/136* (2013.01); *C01P 2002/72* (2013.01); *C01P 2002/77* (2013.01); *Y02E 60/122* (2013.01); *H01M 4/625* (2013.01); *C01P 2004/03* (2013.01); *C01P 2002/76* (2013.01); *H01M 10/052* (2013.01)
USPC .......................... 252/503; 252/506; 423/447.8

(56) References Cited

U.S. PATENT DOCUMENTS

2012/0207994 A1\* 8/2012 Wang et al. .................... 428/219
2013/0164625 A1\* 6/2013 Manthiram et al. ....... 429/231.8
2013/0302684 A1\* 11/2013 Koshika et al. ............... 429/220

OTHER PUBLICATIONS

Ji et al., "A highly ordered nanostructured carbon-sulfur cathode for lithium-sulphur batteries," *Nature Materials*, vol. 8, pp. 500-506, 2009.

Zheng et al., "Novel nanosized adsorbing sulfur composite cathode materials for the advanced secondary lithium batteries," *Electrochimica Acta*, vol. 51, pp. 1330-1335, 2006.

Wang et al, "Polymer lithium cells with sulfur composites as cathode materials," *Electrochimica Acta,* vol. 48, pp. 1861-1867, 2003.

International Search Report issued in International Application No. PCT/FR2010/000500 dated Oct. 6, 2010.

\* cited by examiner

COMPOSITE SULPHUR/CARBON CONDUCTIVE MATERIAL, USE AS AN ELECTRODE AND METHOD FOR PRODUCING SUCH A MATERIAL

BACKGROUND OF THE INVENTION

The invention relates to a method for producing a powdery composite sulphur/carbon conductive material obtained solely from an initial sulphur and an initial carbon.

The invention also relates to a powdery composite sulphur/carbon conductive material obtained directly by such a production method and use thereof as active material of an electrode, in particular of a lithium storage battery.

STATE OF THE ART

Sulphur can be used as active material in electrodes in particular for lithium-sulphur (Li/S) batteries. Li/S batteries constitute a possible alternative to conventional lithium-ion (Li-ion) batteries used for energy storage in particular for electric vehicles or photovoltaic cells.

It is in fact known that sulphur used as positive electrode in a Li/S storage battery has a theoretical specific capacity of 1675 mAh/g of sulphur.

In Li/S batteries, the global electrochemical reaction between lithium and sulphur creates a potential difference of 2V and can be represented by the following equilibrium:

$$2Li + S \rightleftharpoons Li_2S$$

On account of its high theoretical mass energy density (2600 Wh/$kg_{Li_2S}$), its natural abundance and its low toxicity, sulphur is a promising material for use as active material of a Li-ion battery. These sulphur-based batteries are promising candidates capable of meeting the mass energy requirements in the autonomous power supply field.

Nevertheless, at the present time, sulphur-based positive electrodes give results that are considerably lower than the theoretical capacities. The causes of these poor performances are in particular due to the low electronic conductivity of sulphur with a conductivity σ of $5*10^{-30}$ S/m. In known manner, a conductive material such as carbon can be incorporated in the sulphur to overcome this problem. A sulphur/carbon mixture is generally obtained by means of a conventional mixing and/or mechanical grinding technique. In the article "All solid-state battery with sulphur electrode and thio-LiSiCON electrolyte", (Journal of Power Sources, 2008, vol. 182, no. 2, P. 621-625), Kobayashi, T. et al. for example described a sulphur/carbon composite obtained by mechanical mixing with a carbon/sulphur weight ratio of 50:50. The size of the initial sulphur particles, comprised between 1 and 10 μm, then remains unchanged in the sulphur/carbon composite.

A sulphur/carbon powder produced in this way can be either directly formed mechanically or mixed with a binder to form an electrode. The binder then performs mechanical cohesion of the sulphur and carbon particles. The intrinsic capacities and the electrochemical performances of the electrode depend in critical manner on the ability of the electrons, generated by the electrochemical reactions, to circulate within the electrode. The interactions and the proximity between the sulphur and carbon particles are consequently of paramount importance on the electronic conduction. The quality of the sulphur/carbon mixture notably improves the capacities of the electrode produced by means of this mixture.

Recent works have been carried out in order to improve the quality of the performances of sulphur-based electrodes. In particular, the articles by Ji, X. et al. (Nature Materials, 2009, vol. 8, n°6, P. 500-506), by Zheng, W. et al. (Electrochimica Acta, 2006, vol. 51, P. 1330-1335) and by Wang, J. et al. (Electrochimica Acta, 2003, vol. 48, P. 1861-1867) describe methods for producing an electrode comprising a carbon-based porous conductive material the pores of which are filled with sulphur.

Likewise, the document U.S. Pat. No. 7,361,431 describes a method for producing an electrode comprising a porous conductive material the pores of which are filled with sulphur and/or with a sulphurated organic compound. The sulphur-based porous conductive material is obtained from heat-treated porous carbon and sulphur. Heat treatment is performed in a sealed container kept at a temperature comprised between 30° C. and 300° C. and under a controlled pressure comprised between $10^{-6}$ Torr and 760 Torr. Heating makes the sulphur melt and/or vaporize which then fills the pores of the carbon. The gases present in the pores and in the container can then be eliminated by reducing the pressure inside the sealed container to a pressure ranging from $10^{-6}$ Torr to 760 Torr. The sulphur solidifies inside the pores to form an amorphous conductive material.

Nevertheless, the method for producing such a porous conductive material, filled with sulphur, remains difficult to implement and results in a large loss of material, in particular of sulphur. A part of the sulphur vaporized during the heat treatment steps is in fact eliminated when the vacuum is created, which therefore results in a large consumption of sulphur.

OBJECT OF THE INVENTION

One object of the invention is remedy the shortcomings of the prior art, and in particular to propose a sulphur-based material having a good electronic conductivity and able to be used as active material of an electrode, in particular of lithium batteries presenting electrochemical properties with high performances.

It is a further object of the invention to provide a production method that is simple, easy to implement and inexpensive enabling such a material to be obtained with a high yield.

According to the invention, this object is achieved by a method for producing a composite sulphur/carbon conductive material, a powdery composite sulphur/carbon conductive material directly obtained by such a method and the use of such a material, according to the indexed claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS OF THE INVENTION

Figure 1:
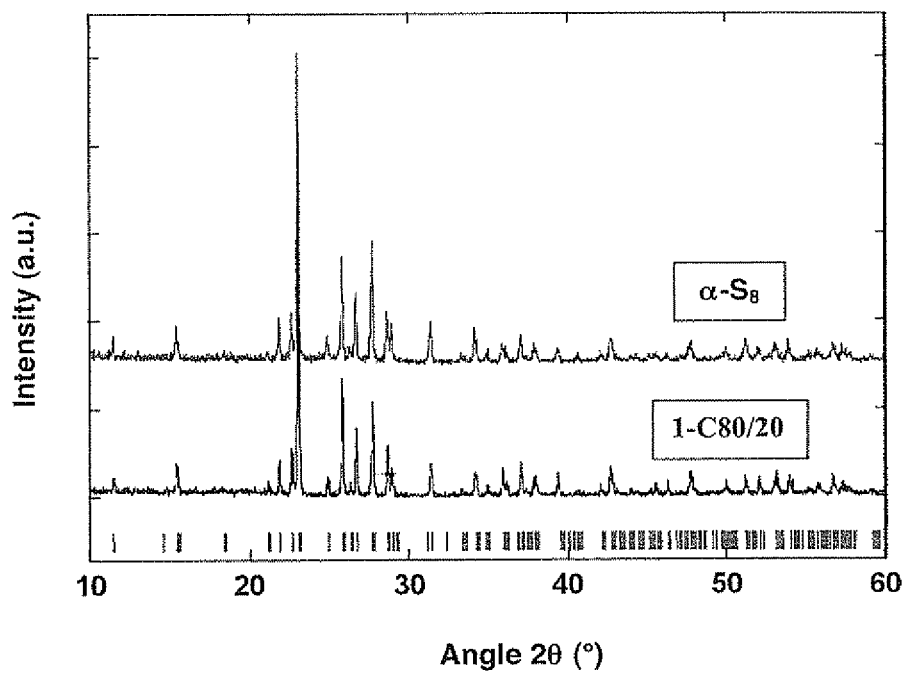
FIG. 1 represents, on the same graph, two diagrams of X-ray diffraction ($\lambda_{CuK\alpha}$) representing the intensity, measured in arbitrary unit, versus the angle 2θ, respectively of a sulphur $S_8$ of α-orthorhombic structure in powder form marketed by the Aldrich Company, and of a composite sulphur/carbon conductive material according to the invention obtained in example 1 (1-C80/20).
Figure 2:
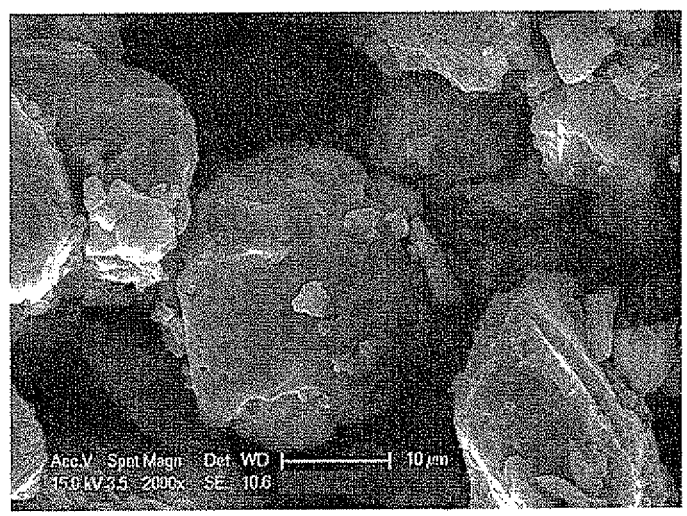
FIG. 2 represents a snapshot obtained by scanning electron microscopy (SEM) with an enlargement×2000 of the α-$S_8$ sulphur of FIG. 1.

According to a first particular embodiment, the production method enables a powdery composite sulphur/carbon conductive material to be obtained solely from sulphur and carbon. The conducting and electrochemical properties of the composite sulphur/carbon conductive material obtained are optimized.

For the sake of clarity, the term "initial carbon" will be used in the remainder of the description to designate an initial compound formed by a type of carbon or by several types of carbon. What is meant by type of carbon is a particular allotropic structure or shape of the carbon.

The initial carbon can for example be formed by one or more shapes chosen from a spheroid, ovoid, fibrous or tubular shape. The initial carbon also comes in the form of a single-layer or multilayer structure.

The initial carbon can likewise be formed by one or more allotropic carbon shapes.

The initial carbon can thus be a powdery mixture of carbons having different properties, in particular electronic and mechanical properties, depending on the allotropic structure and/or shape of each carbon constituting the mixture.

The initial carbon is advantageously formed by one or more carbons chosen from graphite, carbon black, carbon fibers, carbon nanotubes and fullerenes.

The specific surface of the initial carbon is smaller than or equal to 200 $m^2/g$, preferably smaller than or equal to 65 $m^2/g$.

Likewise, for the sake of clarity, the term "initial sulphur" will be used in the remainder of the description to designate an initial compound formed by a type of sulphur or several types of sulphur. What is meant by type of sulphur is a particular allotropic structure or shape of the sulphur.

The initial sulphur is formed by one or more allotropic sulphur shapes chosen from the α-orthorhombic and β-monoclinic shapes. The initial sulphur is preferably an α-orthorhombic $S_8$ sulphur.

The initial sulphur and carbon are advantageously two distinct powders. The initial sulphur and carbon can be mixed beforehand or inserted separately into a reactor. An autoclave reactor or a digestion bomb, able to be hermetically sealed and to withstand high pressures, generally in the region of 150 bars, is for example used.

The method for producing the powdery composite sulphur/carbon conductive material comprises insertion of the initial sulphur and carbon only into the reactor, at atmospheric pressure. The proportions are comprised between 50% and 90% by weight of initial sulphur and between 50% and 10% by weight of initial carbon, so that the sum of the proportions respectively of the initial sulphur and carbon attains 100%.

The reactor is closed and hermetically sealed under atmospheric pressure. Initially therefore, i.e. before any heat treatment, the inside of the closed and sealed reactor is at atmospheric pressure. The reactor is then heated to a heating temperature ($T_c$) comprised between 115° C. and 400° C., preferably between 125° C. and 200° C. The hermetically sealed reactor can for example be heated in an oven.

Heating of the hermetically sealed reactor to $T_c$ causes melting only of the sulphur inside the reactor. At this temperature $T_c$, the sulphur is for the most part in liquid form, in equilibrium with a part of the sulphur in vapor form. Heat treatment is performed without creating a vacuum in the reactor to prevent total vaporization of the sulphur.

The hermetically sealed reactor is then maintained at the heating temperature ($T_c$) during a predetermined time. What is meant by a "predetermined time" is a sufficient time to melt the initial sulphur and to reach equilibrium. The heating time is determined according to the quantity of initial sulphur and carbon placed in the reactor.

The heating time of the hermetically sealed reactor at the heating temperature ($T_c$) can be comprised between 2 h and 168 h, preferably between 6 h and 36 h.

This heat treatment step is advantageously performed in the presence of air. Melting of the initial sulphur is thus accompanied by partial formation of gaseous sulphur, essentially in the form of sulphur dioxide ($SO_2$) according to the following reaction (1):

$$S_8 + 8O_2 \approx 8SO_2 \qquad (1)$$

Other derivatives of sulphur such as sulphur trioxide ($SO_3$) can also be formed as a result of oxidation of the sulphur dioxide ($SO_2$) according to the following reaction (2):

$$2SO_2 + O_2 \approx 2SO_3 \qquad (2)$$

When heating is performed, the pressure inside the reactor initially at atmospheric pressure increases until it reaches an equilibrium pressure ($P_{eq}$) according to a known thermodynamic phenomenon resulting from the temperature increase inside the hermetically sealed reactor and the formation of the sulphurated gas.

No external pressure regulation is performed inside the hermetically sealed reactor. What is meant by external pressure regulation is regulation of the pressure inside the reactor enabling either atmospheric pressure to be maintained inside the reactor or reducing the pressure, for example until a vacuum is created in the reactor, or inversely, increasing the pressure to pressures greater than $P_{eq}$.

Increasing the pressure inside the reactor from atmospheric pressure to the pressure $P_{eq}$ enhances stirring of the material, and in particular of the carbon particles in the molten sulphur. Heating of the closed reactor in particular is ensures homogenization of the medium resulting in a homogeneous sulphur/carbon mixture.

After heat treatment, the temperature of the reactor preferably naturally and progressively returns to ambient temperature. What is meant by "naturally" is the fact that no active cooling is performed. After heating has been stopped, the temperature of the reactor returns to ambient temperature solely by heat exchanges between the ambient air and the reactor. When heating is performed in an oven, the cooling time will therefore depend on the thermal inertia of the oven.

According to an alternative embodiment, the temperature of the reactor is reduced to ambient temperature after heat treatment by active cooling, by immersing a part of the reactor in a water bath or in a liquid nitrogen bath.

After the reactor has been opened, a fine black powder constituting the composite sulphur/carbon conductive material is recovered.

The proportion of sulphur in the composite sulphur/carbon conductive material advantageously represents between 50% and 90% by weight of the total weight of the composite sulphur/carbon conductive material.

The composite sulphur/carbon conductive material directly obtained according to the method described in the foregoing is preferably formed by sulphur and carbon in proportions comprise between 50% and 90% by weight for the sulphur and between 50% and 10% by weight for the carbon. The production method therefore enables a composite sulphur/carbon conductive material to be obtained almost without loss of raw materials in the course of the different steps of the production method. The losses of initial sulphur and/or carbon are advantageously less than 5%, preferably less than 1% by weight with respect to the total weight of initial sulphur and carbon.

According to a particular embodiment, the production method comprises an additional step of grinding of the composite sulphur/carbon conductive material to obtain a homogeneous grain size distribution. After it has returned to ambient temperature and atmospheric pressure, the reactor is opened and the composite sulphur/carbon conductive material is recovered. The latter is then mechanically grinded by dry or wet process according to any known method. For example purposes, mechanical grinding of the composite sulphur/carbon conductive material powder is performed during a period comprised between 15 min and 24 h.

Preparation of a Composite Sulphur/Carbon Conductive Material:
Characteristics of the Initial Products
Carbon
  Carbon of Super P™ type, marketed by the Timcal Company: specific surface 62 m²/g.
  Carbon fibers of VGCF® (standing for vapor grown carbon fiber) type, marketed by the Showa Denko Company: specific surface 13 m²/g.
  Meso-carbon microbeads (MCMB), marketed by the Showa Denko Company: specific surface less than 5 m²/g.
Sulphur
  α-orthorhombic sulphur, α-$S_8$ marketed by the ALDRICH Company.
    Crystallographic parameters:
      space group "Fddd"
      lattice parameters, a=10.45 Å; b=12.84 Å and c=24.4 Å.
  Refined α-orthorhombic sulphur, α-$S_8$ marketed by the ALDRICH Company, having the same crystallographic parameters.

EXAMPLE 1

3 grams of α-orthorhombic sulphur, of flex type, are placed in an autoclave reactor (PARR bomb, model 4749) with a capacity of 23 mL, at atmospheric pressure. 0.75 grams of carbon of Super P™ type are then inserted in the reactor. The latter is then hermetically sealed in air and placed in an oven. The heating temperature ($T_c$) of the study is then set to 125° C. (+/−5° C.) and kept at this temperature for 24 hours. The heating is then stopped. The reactor temperature then returns naturally and progressively to ambient temperature and to atmospheric pressure about 8 h after the heating has been stopped. The reactor is opened and a uniform powder of black color is recovered, formed by fine particles, containing 80% by weight of sulphur and 20% by weight of carbon, the weight percentage being based on the total weight of the composite sulphur/carbon conductive material (1-C80/20) obtained.

As represented in FIG. 1, the X-ray diffraction diagram ($\lambda_{CuK\alpha}$) made on the 1-C80/20 material of example 1 (diagram at the bottom of FIG. 1) is compared with the diagram of particles of initial α-orthorhombic $S_8$ sulphur (diagram at the top of FIG. 1). The diagram of the 1-C80/20 material is similar to that of the α-orthorhombic sulphur. The set of peaks characteristic of α-orthorhombic $S_8$ sulphur can effectively be observed again. Carbon being invisible to X-rays, it is therefore proved that the sulphur in the composite sulphur/carbon conductive material is in the form of crystalline nuclei.

EXAMPLE 2

6 grams of sulphur α-orthorhombic, of flex type, are inserted in an autoclave reactor (PARR bomb, model 4748) with a capacity of 125 mL, at atmospheric pressure. 1.5 grams of carbon of Super P™ type are then inserted in the reactor. The latter is then sealed in hermetic manner in air, and placed in an oven. The heating temperature ($T_c$) of the study is then set to 125° C. (+/−5° C.) and kept at this temperature for 24 hours. The heating is then stopped. The reactor temperature then returns naturally and progressively to the ambient temperature and to atmospheric pressure about 8 h after the heating has been stopped. The reactor is opened and a uniform powder of black color is recovered, formed by fine particles, containing 80% by weight of sulphur and 20% by weight of carbon.

The uniform powder of black color is then mechanically grinded in the following way. 10 grams of powder are placed in a steel grinding cell with a capacity of 50 mL, marketed by the Retsch Company. The grinding cell is formed by a bowl and three agate balls with a diameter of 20 mm. This cell is filled and closed in an argon glove box. The cell is then placed on a centrifugal mechanical grinder of Retsch brand, PM100 model. After 1 hour of grinding at the speed of 500 rpm, in alternating mode, the cell is opened in air and a powder constituting the composite sulphur/carbon conductive material 2-C80/20 is collected.

Figure 3:
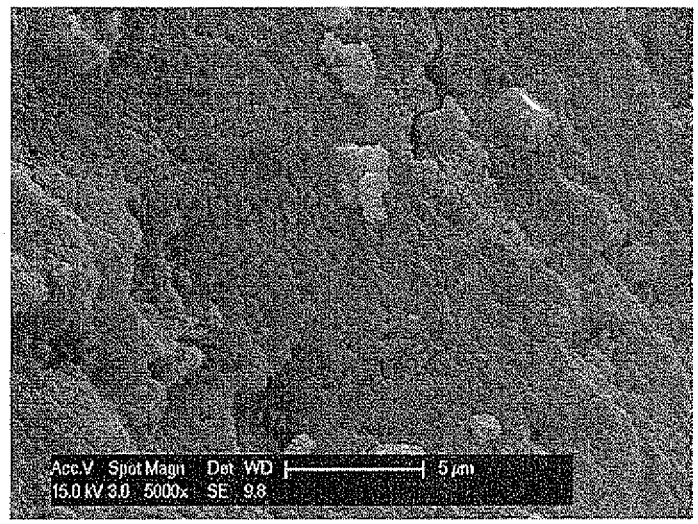
FIG. 3 represents a snapshot obtained by scanning electron microscopy (SEM) with an enlargement×5000 of a composite sulphur/carbon conductive material according to the invention obtained in example 2 (2-C80/20).

FIG. 3 represents a snapshot obtained by scanning electron microscopy (SEM) of the composite sulphur/carbon conductive material 2-C80/20 of example 2 after grinding.

EXAMPLE 3

Fine particles of black-colored powder constituting a composite sulphur/carbon conductive material 3-C60/40 containing 60% by weight of sulphur and 40% by weight of carbon are obtained by means of an identical method to that of example 1, except that 2 grams of α-orthorhombic sulphur and 1.33 grams of carbon of Super P™ type are used.

Figure 4:
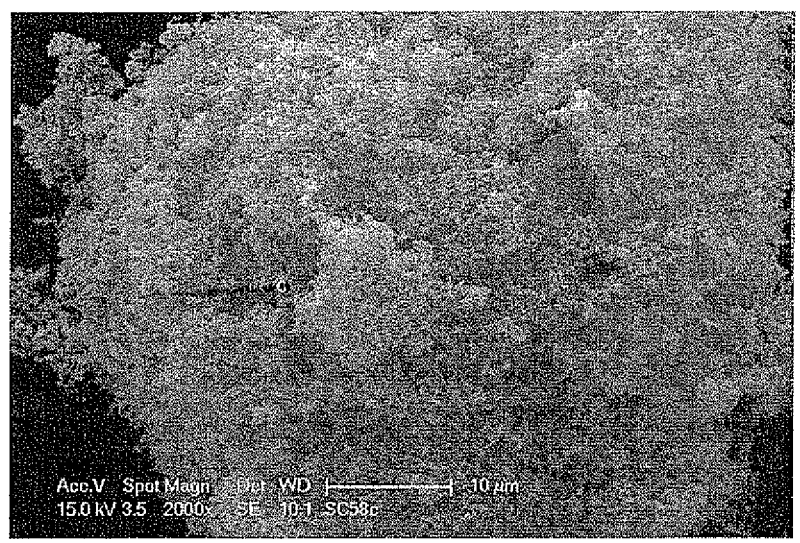
FIG. 4 represents a snapshot obtained by scanning electron microscopy (SEM) with an enlargement×2000 of a composite sulphur/carbon conductive material according to the invention obtained in example 3 (3-C60/40).

FIG. 4 represents a snapshot obtained by scanning electron microscopy (SEM) of the composite sulphur/carbon conductive material 3-C60/40 of example 3.

EXAMPLE 4

Fine particles of black-colored powder constituting a composite sulphur/carbon conductive material 4-C70/30 containing 70% by weight of sulphur and 30% by weight of carbon are obtained by means of an identical method to that of example 1, except that 2.5 grams of refined α-orthorhombic $S_8$ sulphur, marketed by the ALDRICH Company, 0.714 grams of carbon of Super P™ type and 0.357 grams of carbon fibers of VGCF® type are used.

Figure 5:
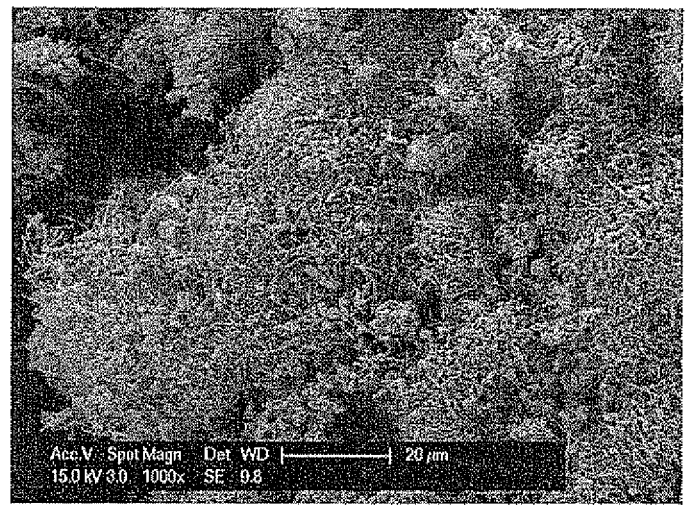
FIG. 5 represents a snapshot obtained by scanning electron microscopy (SEM) with an enlargement×1000 of a composite sulphur/carbon conductive material according to the invention obtained in example 4 (4-C70/30).

FIG. 5 represents a snapshot obtained by scanning electron microscopy (SEM) of the composite sulphur/carbon conductive material 4-C70/30 of example 4.

EXAMPLE 5

Fine particles of black-colored powder constituting a composite sulphur/carbon conductive material 5-C80/20 containing 80% by weight of sulphur and 20% by weight of carbon are obtained by means of an identical method to that of example 1, except that 3 grams of α-orthorhombic sulphur, 0.75 grams of carbon of Super P™ type and a heating temperature ($T_c$) of 150° C. (+/−5° C.) maintained for 12 hours are used.

Figure 6:
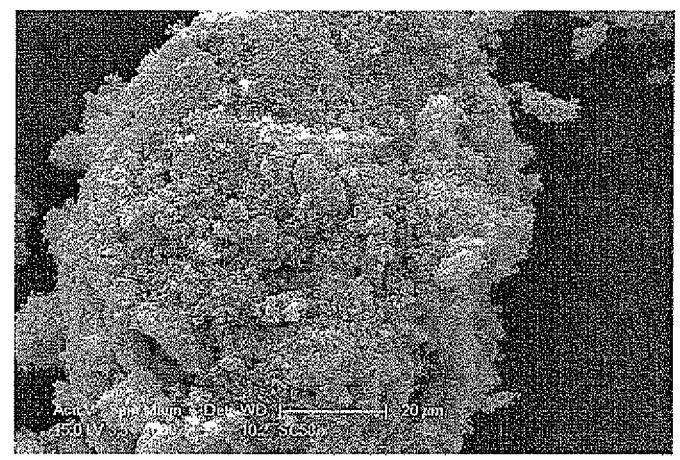
FIG. 6 represents a snapshot obtained by scanning electron microscopy (SEM) with an enlargement×1000 of a composite sulphur/carbon conductive material according to the invention obtained in example 5 (5-C80/20).

FIG. 6 represents a snapshot obtained by scanning electron microscopy (SEM) of the composite sulphur/carbon conductive material 5-C80/20 of example 5.

EXAMPLE 6

Fine particles of black-colored powder constituting a composite sulphur/carbon conductive material 6-C60/40 containing 60% by weight of sulphur and 40% by weight of carbon are obtained by means of an identical method to that of example 1, except that 1.8 grams of α-orthorhombic sulphur, 0.4 grams of carbon of Super P™ type, 0.4 grams of carbon fibers of VGCF® type and 0.4 grams of MCMB spheric carbon are used.

EXAMPLE 7

Fine particles of black-colored powder constituting a composite sulphur/carbon conductive material 7-C60/40 containing 60% by weight of sulphur and 40% by weight of carbon are obtained by means of an identical method to that of example 1, except that 1.5 grams of α-orthorhombic sulphur, 1 gram of carbon of Super P™ type and a heating temperature ($T_c$) of 200° C. (+/−5° C.) maintained for 24 hours are used.

EXAMPLE 8

Fine particles of black-colored powder constituting a composite sulphur/carbon conductive material 8-C60/40 containing 60% by weight of sulphur and 40% by weight of carbon are obtained by means of an identical method to that of example 7, except that heating is performed at a heating temperature ($T_c$) of 125° C. (+/−5° C.) for 8 hours.

EXAMPLE 9

Fine particles of black-colored powder constituting a composite sulphur/carbon conductive material 9-C60/40 containing 60% by weight of sulphur and 40% by weight of carbon are obtained by means of an identical method to that of example 7, except that heating is performed at a heating temperature ($T_c$) of 125° C. (+/−5° C.) for 1 week.

COMPARATIVE EXAMPLE 10

A mixture of powder of a composite sulphur/carbon conductive material 10-C60/40 containing 60% by weight of sulphur and 40% by weight of carbon is obtained by a conventional mechanical grinding method at ambient temperature. 2 g of sulphur and 1.33 g of carbon in powder form are placed in a steel grinding cell with a capacity of 50 mL, marketed by the Retsch Company. The grinding cell is formed by a bowl and three agate balls with a diameter of 20 mm. This cell is filled and closed in an argon glove box. The cell is then placed on a centrifugal mechanical grinder of Retsch brand, PM100 model. After 2 hours of grinding at the speed of 500 rpm, in alternating mode, the cell is opened in air and a powder constituting the composite sulphur/carbon conductive material 10-C60/40 is collected Table 1 below sets out the production conditions of examples 1 to 10.

TABLE 1

| Example n° | Name | Grinding time (H)/ V(rpm) | $m_{Sulphur}$ (g) | $m_{Carbon}$ (g) | Type of carbon | T° C./time (H) | S/C weight % |
|---|---|---|---|---|---|---|---|
| 1 | 1-C80/20 | — | 3 | 0.75 | Super P | 125/24 H | 80/20 |
| 2 | 2-C80/20 | 1/500 | 6 | 1.5 | Super P | 125/24 H | 80/20 |
| 3 | 3-C60/40 | — | 2 | 1.33 | Super P | 125/24 H | 60/40 |
| 4 | 4-C70/30 | — | 2.5 | 0.714 | Super P | 125/24 H | 70/30 |
|   |          |   |     | 0.357 | VGCF fibers |          |       |
| 5 | 5-C80/20 | — | 3 | 0.75 | Super P | 150/12 H | 80/20 |

TABLE 1-continued

| Example n° | Name | Grinding time (H)/V(rpm) | $m_{Sulphur}$ (g) | $m_{Carbon}$ (g) | Type of carbon | T° C./time (H) | S/C weight % |
|---|---|---|---|---|---|---|---|
| 6 | 6-C60/40 | — | 1.8 | 0.4 | Super P | 125/24 H | 60/40 |
|   |          |   |     | 0.4 | VGCF fibers |        |       |
|   |          |   |     | 0.4 | MCMB |             |       |
| 7 | 7-C60/40 | — | 1.5 | 1 | Super P | 200/24 H | 60/40 |
| 8 | 8-C60/40 | — | 1.5 | 1 | Super P | 125/8 H | 60/40 |
| 9 | 9-C60/40 | — | 1.5 | 1 | Super P | 125/168 H | 60/40 |
| 10 | 10-C60/40 | 1/500 | 2 | 1.33 | Super P | $T_{amb.}$ | 60/40 |

In known manner, when a compound is melted and then cooled, when it reverts to solid state, the compound is generally in the form of a single cluster of amorphous structure or in the form of agglomerates.

Thus, on completion of the production method according to the first embodiment and in particular of the heat treatment, we would expect the initial sulphur and carbon to result in a cluster or agglomerates of carbon covered by sulphur having an amorphous structure.

However, as illustrated in FIGS. 3 to 6, the composite sulphur/carbon conductive material of examples 2 to 5 is surprisingly in the form of crystalline nuclei of sulphur and carbon located at the surface of the sulphur nuclei. A composite sulphur/carbon conductive material is formed, in the form of a homogeneous black powder, containing only sulphur in crystalline form and carbon. According to the carbon content in the composite sulphur/carbon conductive material, the carbon either totally or partially covers the surface of the sulphur nucleus.

In the composite sulphur/carbon conductive material, the carbon keeps its original structure and has a specific surface which remains small, i.e. smaller than or equal to 200 $m^2/g$, preferably smaller than or equal to 65 $m^2/g$.

Figure 7:
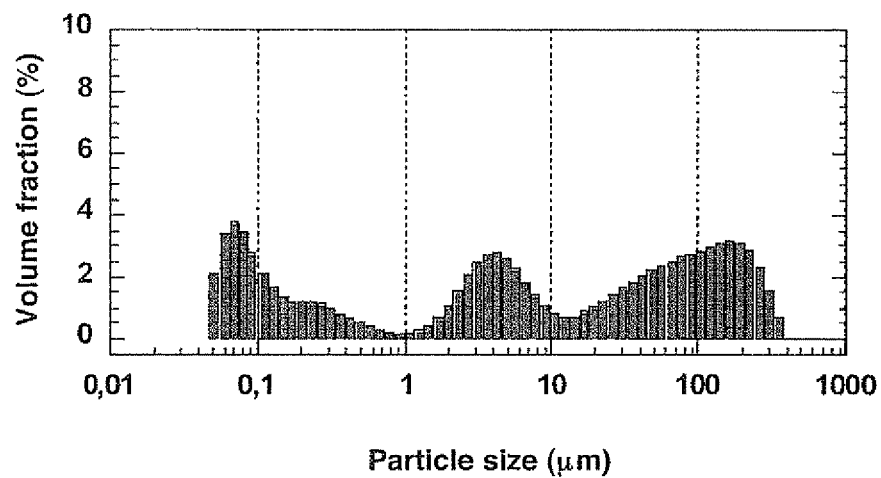
FIG. 7 represents the grain size distribution of a composite sulphur/carbon conductive material 1-C80/20 according to the invention obtained in example 1.

As represented in FIG. 7, the composite sulphur/carbon conductive material 1-C80/20 is formed by fine particles with a homogeneous grain size distribution ranging from 0.05 to 400 mm.

It is surprisingly observed that, after melting, the sulphur in the composite sulphur/carbon conductive material has formed neither clusters nor blocks nor agglomerates but has recrystallized. The carbon has also organized itself around the sulphur nuclei. The composite sulphur/carbon conductive material obtained is thus unexpectedly powdery and has a characteristic grain size with a majority of fine particles having a mean diameter of less than 10 mm.

Figure 8:
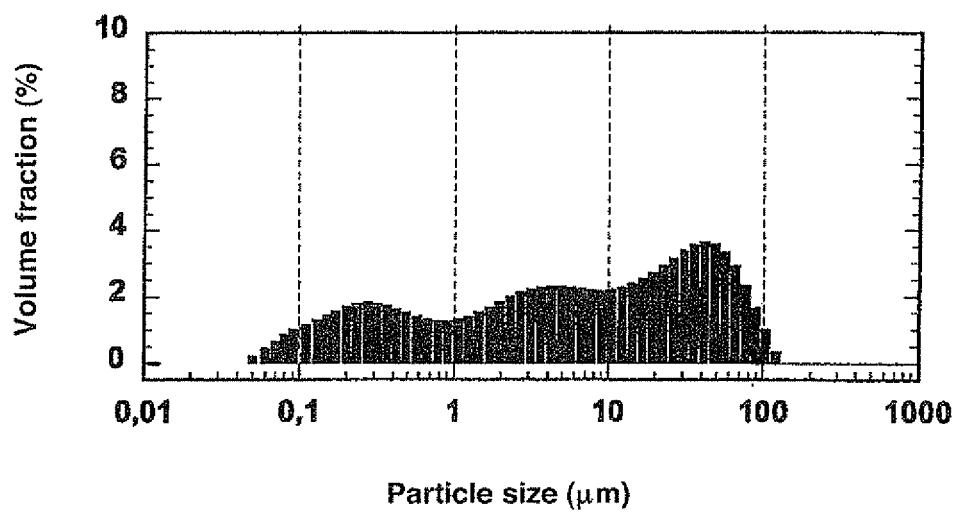
FIG. 8 represents the grain size distribution of a composite sulphur/carbon conductive material 2-C80/20 according to FIG. 3, after a grinding step.
Figure 9:
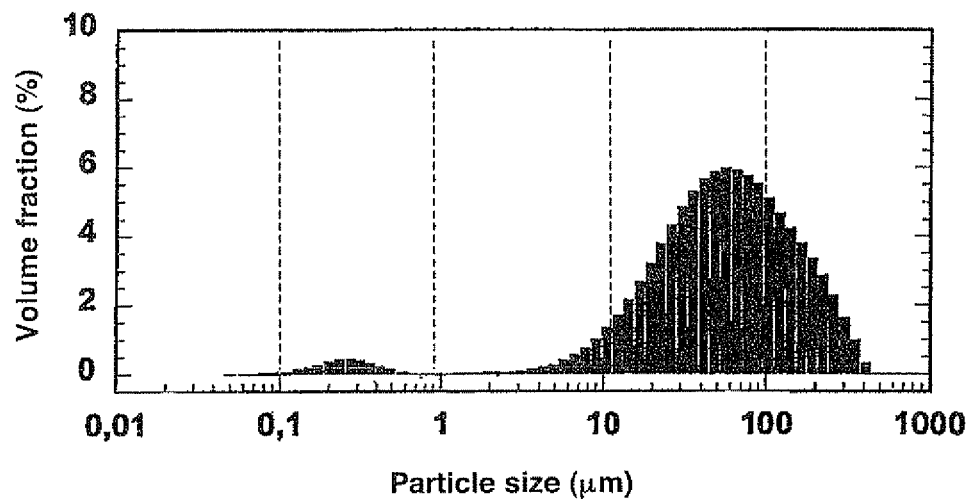
FIG. 9 represents the grain size distribution of a comparative example of α-$S_8$ sulphur powder of orthorhombic structure according to FIG. 2, after a grinding step identical to that of the composite material of FIG. 8.

FIGS. 8 and 9 further provide a comparison of the grain size distribution of the initial $\alpha$-$S_8$ sulphur and of the composite sulphur/carbon conductive material C-80/20 obtained in example 2 after grinding.

Comparatively, the mean size of the particles of composite sulphur/carbon conductive material C-80/20 is smaller than that of the initial $\alpha$-$S_8$ sulphur. The grain size distribution of composite sulphur/carbon conductive material C-80/20 is distributed in homogeneous manner between 0.05 mm and 100 mm whereas that of the initial sulphur is concentrated rather between 0.4 mm and 300 mm.

The different steps of the method for producing the composite sulphur/carbon conductive material described in the foregoing, in particular the heat treatment in a hermetically sealed reactor at atmospheric pressure and progressive cooling, advantageously contribute to recrystallization of the sulphur in the form of crystalline nuclei and to the arrangement of the carbon around the sulphur nuclei.

The method for producing the composite sulphur/carbon conductive material avoids any loss of material as the reactor is hermetically sealed. All the initial carbon and sulphur reacts to form the powdery composite sulphur/carbon conductive material, without any loss of material.

The composite sulphur/carbon conductive material obtained in this way is particularly suitable for use as active material of an electrode. What is meant by active material of an electrode is a material participating in the electrochemical reactions involved within the electrode.

The composite sulphur/carbon conductive material is advantageously suitable for use as active material of an electrode of a lithium battery.

According to a preferred embodiment, the composite sulphur/carbon conductive material is used as active material of an electrode of a lithium/sulphur (Li/S) battery.

According to a particular embodiment, a Li/S battery obtained from the composite sulphur/carbon conductive material described in the foregoing has particularly good performances and advantageously has a specific capacity greater than or equal to about 1300 mAh/g±Δ 50 mAh/g, preferably greater than or equal to 1350 mAh/g±Δ 50 mAh/g of sulphur under a voltage of about 2V.

The composite sulphur/carbon conductive material can be used directly in powder form to produce an electrode of a lithium battery, preferably of lithium/sulphur (Li/S) type.

Alternatively, the composite sulphur/carbon conductive material can be shaped for example in the form of a plasticized film by means of any known method.

To form a film, the composite sulphur/carbon conductive material can be placed in an organic or aqueous solution and mixed with a binder designed to provide mechanical cohesion once the solvent has evaporated.

In known manner, an electrolyte of a Li-ion battery of Li/S type can for example consist of a salt comprising at least one Li$^+$ cation chosen from:

bis[(trifluoromethyl)sulfonyl]imide lithium (LiN(CF$_3$SO$_2$)$_2$), trifluoromethane sulfonate lithium (LiCF$_3$SO$_3$), Bis(Oxalato)Borate lithium (LiBOB), bis(perfluoroethylsulfonyl)imide lithium (LiN(CF$_3$CF$_2$SO$_2$)$_2$), compounds of formula LiClO$_4$, LiAsF$_6$, LiPF$_6$, LiBF$_4$, LiI, LiCH$_3$SO$_3$ or LiB(C$_2$O$_4$)$_2$ and, fluorinated compounds of formula LiR$_F$SO$_3$R$_F$, LiN(R$_F$SO$_2$)$_2$ or LiC(R$_F$SO$_2$)$_3$ where R$_F$ is a group chosen from a fluorine atom and a perfluoroalkyl group comprising between one and eight carbon atoms.

The lithium salt is preferably dissolved in a solvent or a mixture of aprotic polar solvents and can be supported by a separating element arranged between the two electrodes of the battery. The separating element is then imbibed with electrolyte.

In the case of a Li-ion battery with polymer electrolyte, the lithium salt is dissolved in a solid polymer composite such as polyethylene oxide (PEO), polyacrylonitrile (PAN) polymethyl methacrylate (PMMA), polyvinylidene difluoride (PVdF) or one of their derivatives.

A protective layer having a conducting polymer or glass base can also be present in the structure of the Li/S battery to prevent migration of the polysulphides formed in proximity to the positive electrode, during operation of the battery when discharge takes place.

Preparation of a Lithium/Sulphur Battery

For example purposes, a lithium/sulphur battery of button cell type (3-C60/40-Li/S) is produced from a negative electrode made from lithium, a positive electrode having a base formed by the composite sulphur/carbon conductive material 3-C60/40 produced according to example 3 and a separator.

The negative electrode is formed by a circular film with a diameter of 16 mm and a thickness of 130 μm deposited on a stainless steel disc acting as current collector.

The separator is imbibed with a liquid electrolyte with a bis[(trifluoromethyl)sulfonyl]imide (LiTFSI) lithium salt base at a concentration of 1 mol.L$^{-1}$ in a 50/50 volume mixture of tetraethyleneglycol dimethylether (TEGDME) and dioxolane (DIOX).

The positive electrode is formed by 48% by weight of sulphur, 42% by weight of carbon and 10% by weight of polyvinylidene difluoride (PVdF) constituting a binder. The positive electrode is formed by a circular composite film with a diameter of 14 mm and a thickness of about ten micrometers. The positive electrode is deposited on a sheet of aluminum foil with a thickness of 20 mm constituting the current collector. The circular composite film is previously taken from a composite film obtained from a mixture formed by 80% by weight of 3-C60/40 material, 10% by weight of PVdF and 10% by weight of carbon black of super P™ type, the weight percentages being calculated with respect to the total weight of the composite film.

As a first comparative example, a conventional Li/S battery (0-Li/S) identical in all points to the 3-C60/40-Li/S battery is produced from a traditional positive electrode also containing 48% by weight of sulphur, 42% by weight of Super P™ carbon and 10% by weight of PVdF.

Figure 10:
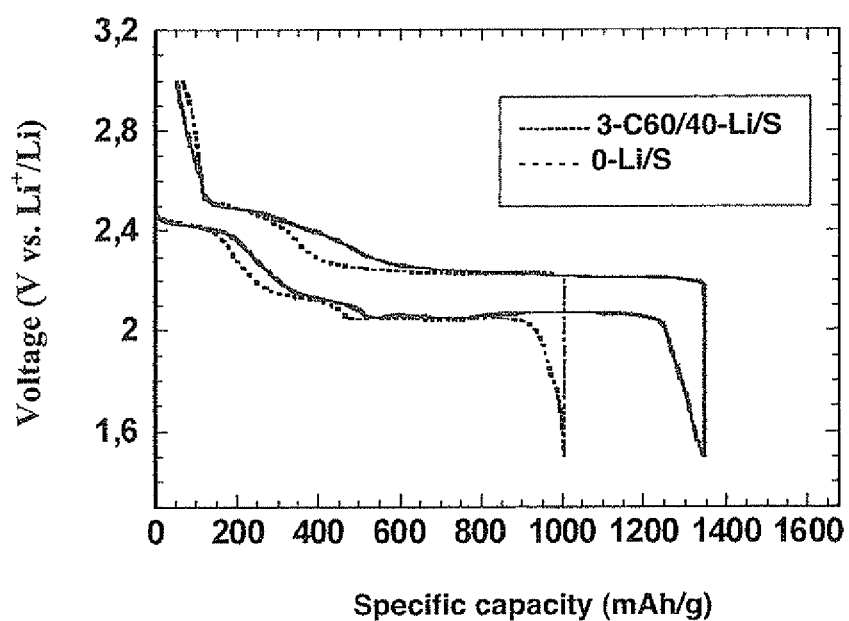
FIG. 10 represents, on the same graph, two plots representing the first charge/discharge cycle, in intentiostatic mode at a rate of C/10 between a potential of 1.5V and 3V vs. $Li^+/Li$, respectively of a button cell battery (3-C60/40-Li/S) comprising a positive electrode having a base formed by the composite sulphur/carbon conductive material according to FIG. 4 (3-C60/40), and of a first comparative example of a conventional Li/S battery (0-Li/S).

An electrochemical test performed on the 3-C60/40-Li/S battery and on the 0-Li/S battery is represented in FIG. 10. The results obtained highlight the high practical specific capacities of the 3-C60/40-Li/S battery, which are close to the theoretical value.

As represented in FIG. 10, at 20° C. and at a rate of C/10, the 3-C60/40-Li/S battery delivers an initial specific capacity of about 1350 mAh/g of sulphur whereas that of the 0-Li/S battery is considerably lower, only reaching about 1000 mAh/g.

Figure 11:
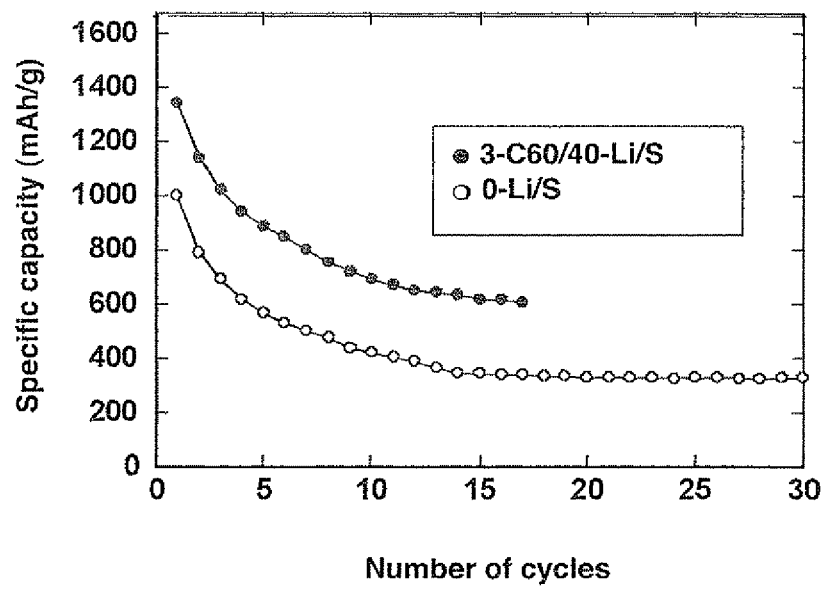
FIG. 11 represents, on the same graph, two plots of the variations of the specific capacity versus the number of cycles, respectively of the battery 3-C60/40-Li/S according to the invention and of the first comparative example of a 0-Li/S battery.

FIG. 11 shows the variation of the specific capacity of the sulphur versus the number of cycles of the 3-C60/40-Li/S battery in comparison with the 0-Li/S battery. This test enables the cyclability of the battery to be evaluated and is representative of its lifetime.

It can be observed that in the course of the cycles, the 3-C60/40-Li/S battery maintains a higher specific capacity than that of the 0-Li/S battery.

As a second comparative example, two 7-C60/40-Li/S and 10-C60/40-Li/S batteries were produced according to the same protocol as the 3-C60/40-Li/S battery with the exception that the active material 7-C60/40 of example 7 and 10-C60/40 of example 10 are respectively used to form the positive electrode and that the positive electrode is constituted by 45% by weight of sulphur, 45% by weight of carbon and 10% by weight of PVdF. The circular composite film is previously taken from a composite film obtained from a mixture formed by 75% by weight of 7-C60/40 or 10-C60/40 material, 10% by weight of PVdF and 15% by weight of carbon black of super P™ type, in order to obtain a positive electrode having an equal weight quantity of sulphur and carbon. The two batteries 7-C60/40-Li/S and 10-C60/40-Li/S are identical in all points with the exception of the method for producing the composite sulphur/carbon material constituting the active material of the electrode. They in fact only differ in that the 7-C60/40 sulphur/carbon active material is obtained according to the method of the invention, whereas the 10-C60/40-Li/S sulphur/carbon active material is obtained by a conventional mechanical grinding method.

Figure 12:
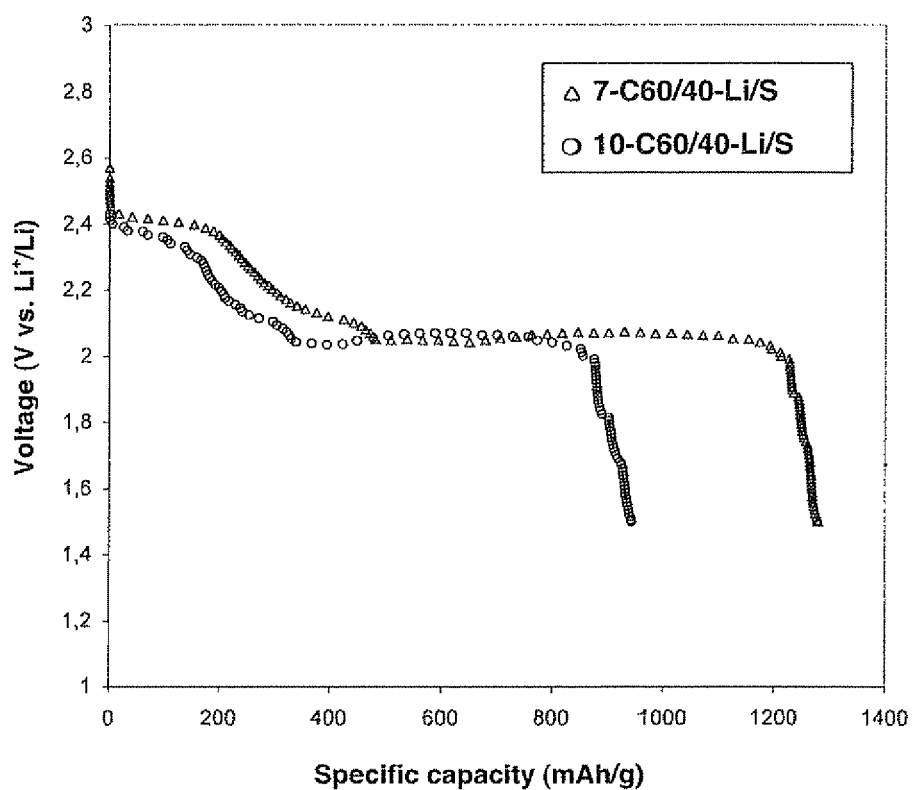
FIG. 12 represents, on the same graph, two plots representing the first discharge, in galvanostatic mode, at a rate of C/10 at 20° C., between the potential of 1.5V and 3V vs. $Li^+/Li$, respectively of a button cell battery (7-C60/40-Li/S) comprising a positive electrode having a base formed by the composite sulphur/carbon conductive material, 7-C60/40, and of a second comparative example of a battery (10-C60/40-Li/S) comprising a positive electrode having a base formed by the composite sulphur/carbon conductive material, 10-C60/40, obtained by a conventional grinding method.

Two electrochemical tests performed on the 7-C60/40-Li/S and 10-C60/40-Li/S batteries are represented on the same graph in FIG. 12. The results obtained highlight the considerably higher specific capacity of the 7-C60/40-Li/S battery compared with that of the 10-C60/40-Li/S battery.

As represented in FIG. 12, at 20° C. and at a rate of C/10, the 7-C60/40-Li/S battery delivers an initial specific capacity of about 1300 mAh/g of sulphur whereas that of the 10-C60/40-Li/S battery is much lower, only reaching about 950 mAh/g. An important technical effect is therefore observed resulting from the production method used for obtaining the composite sulphur/carbon conductive material of the invention.

The composite sulphur/carbon conductive material according to the invention thus presents better conductive and electrochemical properties than a conventional powdery carbon/sulphur mixture of a positive electrode of a Li/S battery. The cohesion of the sulphur and carbon particles in fact enhances electronic conduction within the positive electrode and improves the specific capacity of the material forming the positive electrode of the Li/S battery. In this type of electrode obtained by simple mixing of carbon and sulphur however, the sulphur and carbon particles are poorly dispersed.

The positive electrode produced with the composite sulphur/carbon conductive material has a stable structure on charge and discharge and differs from a conventional sulphur-based positive electrode among other things by the specific capacity results of the sulphur which are greater than or equal to about 1300 mAh/g, preferably 1350 mAh/g.

The method for producing the composite sulphur/carbon conductive material described in the foregoing is simple to implement and inexpensive. It enables sulphur and carbon to be combined to form a composite having improved electrochemical and conductive properties that the initial compounds alone do not possess. This synergy can be attributed to the structure of the composite sulphur/carbon conductive material, in particular to the crystalline structure of the sulphur and to the organization of the carbon around the sulphur nuclei. The carbon situated around the sulphur ensures electronic conduction in the composite sulphur/carbon conductive material.

The invention is not limited to the embodiments described above for non-restrictive example purposes. Although the example given is that of use as active material of a positive electrode of a Li/S battery, the composite sulphur/carbon conductive material can be used in any positive or negative, sulphur-based electrode.

The invention claimed is:

1. A method for producing a composite sulphur/carbon conductive material obtained from a mixture consisting of an initial sulphur and an initial carbon, comprising the following successive steps:
   placing between 50% and 90% weight of initial sulphur and between 50% and 10% weight of initial carbon having a specific surface smaller than or equal to 200

$m^2/g$ in a reactor at atmospheric pressure, the sum of the proportions respectively of the initial sulphur and carbon attaining 100%, hermetically sealing the reactor at atmospheric pressure, and forming the composite sulphur/carbon conductive material, in the form of a powder, by heat treatment by heating said reactor to a heating temperature comprised between 115° C. and 400° C., without external regulation of the pressure inside the reactor, and keeping said reactor at said heating temperature for a predetermined time.

2. The method according to claim 1, wherein the heating temperature Tc is comprised between 125° C. and 200° C.

3. The method according to claim 1, wherein the initial carbon is constituted by one or more allotropic forms of carbon.

4. The method according to claim 1, wherein the initial sulphur is constituted by one or more allotropic forms of sulphur.

5. The method according to claim 4, wherein the initial sulphur is an α-orthorhombic $S_8$ sulphur.

6. The method according to claim 1, wherein the temperature of the reactor returns naturally and progressively to ambient temperature after the heat treatment.

7. The method according to claim 1, wherein the composite sulphur/carbon conductive material obtained after the heat treatment is then mechanically grinded to obtain a homogeneous grain size distribution.

8. The method according to claim 1, wherein the heat treatment step is performed in the presence of air.

9. The method according to claim 1, wherein the specific surface of the initial carbon is smaller than or equal to 65 $m^2/g$.

* * * * *